United States Patent [19]

Friemel

[11] Patent Number: 4,651,463
[45] Date of Patent: Mar. 24, 1987

[54] PROCESS AND APPARATUS FOR TREATING BULK COMMODITIES

[75] Inventor: Wolfgang Friemel, Heppenheim, Fed. Rep. of Germany

[73] Assignee: Dr. Werner Freyberg Chemische Fabrik Delitia Nachf, Laudenbach, Fed. Rep. of Germany

[21] Appl. No.: 517,144

[22] Filed: Jul. 25, 1983

[30] Foreign Application Priority Data

Jul. 26, 1982 [ZA] South Africa ............... 82/5322

[51] Int. Cl.$^4$ .................................... A01M 13/00
[52] U.S. Cl. .................................... 43/125; 422/32; 422/305
[58] Field of Search ............... 43/125, 124; 422/28, 422/32, 305; 426/312

[56] References Cited

U.S. PATENT DOCUMENTS

| | | | |
|---|---|---|---|
| 1,675,123 | 6/1928 | Metzger | 422/305 |
| 3,097,916 | 7/1963 | Dawson | 422/32 |
| 4,200,657 | 4/1980 | Cook | 426/312 |
| 4,215,508 | 8/1980 | Allen | 43/125 |
| 4,223,044 | 9/1980 | Se | 422/32 |
| 4,347,241 | 8/1982 | Kapp | 424/128 |
| 4,421,742 | 12/1983 | Friemel | 424/128 |

FOREIGN PATENT DOCUMENTS 33437  3/1980 Japan.

Primary Examiner—Gene P. Crosby
Attorney, Agent, or Firm—Millen & White

[57] ABSTRACT

In the fumigation of bulk materials such as grain with hydrogen phosphide (phosphine) the gas containing hydrogen phosphide is caused to circulate in a closed loop passing through the bulk material and past the zone of phosphine generation in pulses having a flow rate, duration and pulse intervals so designed that excessive or dangerous accumulations of gas are avoided and that optimum conditions for pest control are attained throughout the system as soon as possible. The intersticial gas of the commodity is changed by the circulation from 5 to 15 times within the period required for 90% of the available phosphine of the metal phosphide to be released. Each pulse has preferably a flow rate and duration sufficient to draw through the bulk commodity a volume of gas at least equal to the volume of the gas space above the bulk commodity and the pulse frequency is at least such that a complete change of intersticial gas in the bulk commodity takes place in less than the time taken for releasing 50% of the available phosphine gas of the composition while the intervals between successive pulses are about from 2 to 100 times as long as the duration of the pulses. Advantageously the flow rate is such as would produce a complete change of intersticial gas in 8 to 80 minutes.

28 Claims, 3 Drawing Figures

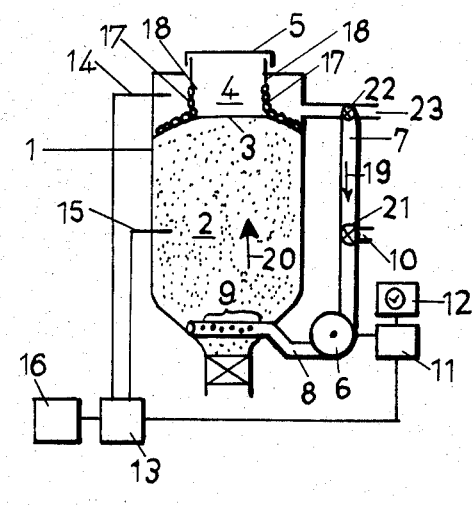
Fig 1
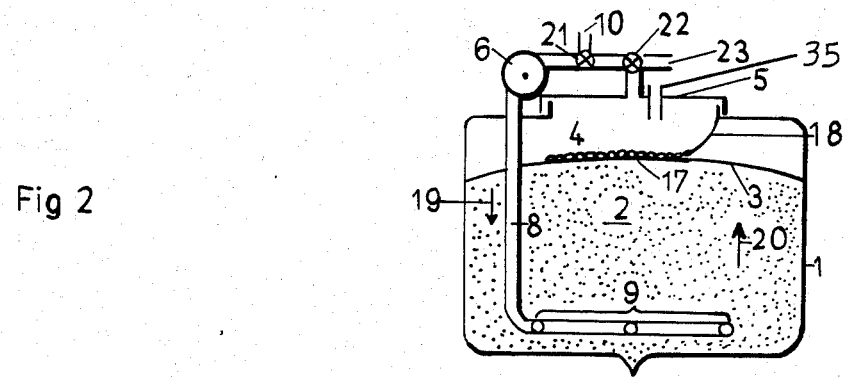
Fig 2
Fig 3
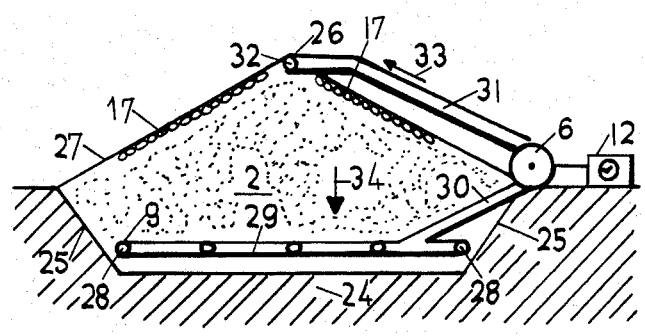

PROCESS AND APPARATUS FOR TREATING BULK COMMODITIES

BACKGROUND OF THE INVENTION

The present invention relates to a process for treating with phosphine gas bulk commodities infested with or susceptible to infestation by pests, whilst being stored or transported in closed spaces such as bulk containers, bulk storage or transportation vessels or bins, silos, shipholds, bulk transport railway or road trucks or the like, comprising controlled hydrolysing over a period of about 0.25 to 20 days a suitable hydrolysable metal phosphide so as to generate phosphine gas, causing or allowing the phosphine gas to spread through the entire bulk commodity, there to be maintained in a concentration and for a duration adapted to destroy such pests as are present in the bulk commodity and to apparatus for carrying out such a process.

In RSA Pat. No. 79/2263 (U.S. Pat. No. 4,215,508 Allen et al) a process and apparatus are described as set out in the aforegoing. According to that disclosure measured portions of hydrolysable metal phosphide pest control composition individually packed in sachets of moisture and gas pervious material or directly are enclosed separately in pockets provided in a long flexible strip of substantial non-hygroscopic and substantially moisture-free material, the pockets being pervious to water vapour and gas. The aforesaid strips containing the portions of pest control agent have become known as "bag blankets" and will be referred to as "bag blankets" in the following (irrespective of whether or not the phosphide composition is first packed into sachets before being inserted into pockets of the strips or whether the pockets are designed to hold the composition—be it in powder, granule, pressed or other form—directly). In the present context bulk commodities are in particular heaped commodities and in particular agricultural bulk commodities such as grain, any other seed commodities, e.g. beans, soya beans, peanuts, cocoa beans, coffee, also any of the aforegoing in processed bulk form such as flour, furthermore non-edible bulk commodities susceptible to pest infestation. The commodities may be of vegetable or animal origin and could for example include fishmeal, bonemeal or carcass meal. According to the abovementioned patent specification, where a silo, storage bin, bulk store, bulk container, shiphold or the like containing such bulk commodity is infested or suspected to be infested by pests, e.g. rodents, but in particular insect pests such as grainborers, weevils, moths or the like, the aforesaid bag blankets containing a predetermined amount of metal phosphide pest control agent are unfolded and spread out rapidly on the upper surface of the bulk commodity, and the container, silo, storage space, shiphold, vessel or the like is closed and sealed off as gastight as possible. The moisture which is normally always present inside such closed spaces then enters in the form of water vapour into the pockets and sachets containing the metal phosphide pest control composition, causing a controlled hydrolysis of the metal phosphide resulting in the release of poisonous phosphine gas. Phosphine gas has a relatively high diffusion rate and as a result can penetrate in an acceptable period of time throughout the entire bulk commodity right to the bottom region thereof, even if the bulk commodity is heaped to a level many meters high. After a greater or lesser period of time it is found that phosphine concentrations throughout the bulk commodity have reached a level sufficient to kill off the pests which are to be controlled, provided the said phosphine level is maintained for an adequate duration. In general within the phosphine concentration ranges applied in practice by those skilled in the art, the time required for complete killing of the pests to be controlled is approximately inversely proportional to the phosphine concentration employed at any given temperature. The rate at which phosphine gas is released from metal phosphide compositions depends on the nature of the metal phosphide, (usually aluminium phosphide or sometimes magnesium phosphide and in certain instances also calcium phosphide), the particle size of the metal phosphide, the manner in which the metal phosphide is compounded with a variety of additives known to those skilled in the art, whether or not the composition takes the form of a powder, granulate, pellets or tablets or is pressed into slabs with fibrous carrier substances. The release rate also depends on the availability of moisture, i.e. the ambient humidity and the rate at which such humidity permeates through the material of e.g. the bag blankets and the sachets and finally on the temperature of the environment. In practice the release is only completed in a period of from about 0.25 to 20 days and usually in from 1 to 5, e.g. in the case of AlP. 2 to 3 days or longer, e.g. up to 10 days at low temperatures. The lowest concentrations are only lethal if maintained for 3–4 weeks. Suitable phosphine gas concentrations for pest control purposes are in the range of from 50 ppm to 5000 ppm (parts per million), usually not less than 100 ppm, preferably 500 ppm to 2200 ppm, and the recommended periods of exposure of the bulk commodity to the aforesaid concentrations of phosphine gas for reliable disinfestation are from 500 hours to 48 hours and at the preferred concentration from 250 hours to 50 hours or from 250–100 hours for very resistant pests.

The above-described method of using "bag blankets" has proved to be highly effective in practice, resulting in complete disinfestations within acceptably short periods of time. The bag blankets can be introduced rapidly and without appreciable loss of phosphine gas or health risk to the operators and after completion of the fumigation the spent bag blankets can be easily retrieved and disposed of without leaving behind any residues of the pest control compositions in the bulk commodity. However, although the diffusion rate of phosphine gas is high, the period required for complete penetration to extreme distances from the locality of application of the bag blankets can be quite appreciable, e.g. 2 to 3 days. In very large silos the time taken by the gas to travel downwards may be too long to be acceptable, e.g. 2–3 weeks in extreme cases. Moreover, at any given period of time, different phosphine concentrations are likely to prevail in different parts of the bulk material. To ensure that all parts of the bulk commodity are adequately exposed to the gas, it is thus necessary to either employ relatively large quantities of metal phosphide composition or to employ excessively long exposure times. Long exposure times and long periods of travel of the phosphine gas through the bulk material are disadvantageous, because during such periods losses of phosphine gas may occur due to slow leakage and other causes known in the art.

Also during the diffusion of the phosphine gas downward, large amounts of phosphine gas simultaneously accumulate in the space above the bulk commodity, particularly if a storage or transport space is only partly filled, and in such empty space the phosphine gas is substantially ineffective and wasted. Finally, in order to supply adequate concentrations of phosphine gas to all parts of the bulk commodity, it may be unavoidable to have very much higher concentrations in the more immediate vicinity of the bag blankets, such concentrations may be higher than the optimum range. If rapid very high accumulations of phosphine gas occur, this may result in putting certain pests into a state of suspended animation or temporary coma without actually killing them, which may result in such pests surviving the fumigation period. Also, excessive accumulations of phosphine gas could in extreme cases result in flammable or even explosive mixtures of phosphine and air. For safety reasons this is obviously undesirable.

In South African patent No. 79/6807 (corresponding to U.S. Pat. No. 4,200,657) methods are described wherein a fumigant, in particular phosphine gas is caused to flow very slowly through a heaped bulk commodity contained in a silo, storage container or the like. According to the more specific disclosure, tablets of phosphine releasing metal phosphide composition are scattered over the surface of the bulk commodity and light suction is applied to the bottom of the bulk commodity pile, the air there withdrawn being circulated to the top of the container. According to that disclosure "the method has been successfully tested with an air flow low enough to effect a 3.5 day air change" while "optimum results have been obtained from the method when the rate of the air is maintained between approximately 0.0015 cubic feet per minute per bushel, (0.0014 m$^3$/min/m$^3$ grain=6.5 hours air change) and 0.0008 cubic feet per minute per bushel (0.00075 m$^3$/min./m$^3$ grain=11 hour air change)".

A less preferred method according to that disclosure, designed to achieve the same effect is to apply higher rates of flow for very brief durations, e.g. from 1 to 5 minutes spaced at intervals of 3 to 4 hours, so that for the flow rates in that case contemplated the ultimate result is equivalent to the aforegoing, namely a total air change over a prolonged period which may be as long as 3.5 days. However, such a procedure involves additional risks, particularly at high ambient temperatures at which the explosive limit of PH$_3$ is reduced and at which PH$_3$ becomes auto-ignitable even by relatively slight pressure changes. Whereas at 20° C. the auto-ignition limit is at 17900 ppm this limit drops to lower values at higher temperatures. That limit can easily be attained after 6–8 hours if the circulation is too slow. However, even at ambient temperatures as low as 30° C., the slow circulation can substantially increase the risk of auto-ignition. Scattering of tablets or pellets on the surface of the bulk commodities results in contamination thereof with the residue of the spent tablets or pellets.

The low rate of circulation does not avoid the aforementioned disadvantage that relatively large quantities of phosphine gas may accumulate almost ineffectively in the sometimes large empty space above the bulk commodity, nor will it avoid with certainty or at all the local accumulation of disadvantageously high concentrations of phosphine gas in the immediate vicinity of the phosphine generating composition. These prior teachings inter alia do not relate the circulation parameters to the rate of phosphine release. Accordingly, apart from the potential fire hazard, there is the risk of the aforesaid "narcosis effect" due to rapid excessive local concentration rises. On the other hand, elsewhere in the system the concentration rise will be too slow for optimally effective pest control. Moreover, a slow circulation rate is inclined to result in slow decomposition of the metal phosphide due to localized moisture starvation which is not replenished by moisture from elsewhere in the system.

The present invention is based on the recognition of the aforegoing disadvantages of the prior art and teaches ways and means for avoiding those disadvantages. More particularly, the present teachings can be employed to accelerate the rapid and sufficiently uniform distribution of phosphine gas throughout a bulk commodity, to improve fumigation efficiency both in terms of time and consumption of pest control composition and to avoid disadvantageously high local accumulations of phosphine gas. The invention can be employed to shorten fumigation times and to reduce losses of phosphine gas occurring when longer fumigation periods are employed and generally to optimise fumigation efficiency.

SUMMARY OF THE INVENTION

Having regard to the aforegoing, the present invention provides a process as set out in the introduction, wherein a closed loop gas flow is induced through the bulk commodity through the region or regions where the phosphine gas is released towards a region or regions of the bulk commodity remote and opposite to the region(s) of phosphine release and from there back along a separate return path to the beginning of the loop, the flow induction being commenced before the phosphine concentration in a zone close to, e.g. within 10 cm from the phosphine liberation region(s) averages more than a predetermined limit, e.g. of 50% above a preselected value and is maintained at a concentration-reducing rate at least until the concentration in the zone has dropped below that value to a second value less than or at the most approximately equal to the average concentration throughout the space, the flow induction being repeated for as often and as long as is necessary to avoid phosphine concentration rises in the zone above the said limit.

DETAILED DISCUSSION

The said limit may be related to the maximum safe limit to avoid auto-ignition even at high ambient temperature, which means that at no place in the phosphine release region should the concentration rise higher than 6000 ppm PH$_3$.

The said limit may also be related to a predetermined maximum concentration to be reached in the bulk commodity during the entire fumigation period. That maximum concentration is normally between 500 ppm and 5000 ppm PH$_3$, depending on the time available for the fumigation, climatic conditions, gas tightness of the space, and the species of pests to be eradicated. The effects of these variables on the optimum concentration of PH$_3$ for fumigation and the maximum concentration which will then be reached in accordance therewith are well known to persons skilled in the art. Preferably the said limit is set not to exceed such maximum concentration by more than 50%, more preferably not by more than 20%, and in any event not to exceed the auto-ignition limit.

In order to achieve a rapid attainment of a lethal concentration of PH$_3$ throughout the bulk commodity it is preferred, at least in the initial stages (e.g. the first day of the fumigation), not to allow the concentration in the immediate vicinity of the gas generation to even rise as high as the said maximum. The maximum is at the upper limits of the practical suitable concentrations for pest control purposes described further above.

It is preferred for the gas flow of the loop to pass through the bulk commodity in an upward direction. It is furthermore preferred to carry out the gas generation in or above the upper region, preferably the latter, of the bulk commodity and to withdraw by suction phosphine-containing gas from this upper region or gas space above the upper region and conduct this gas into the bottom region of the bulk commodity from there to pass upwards through the bulk commodity, again towards the upper region.

As an alternative to or in addition to the commencement of the gas circulation being related to the concentration of $PH_3$ in the immediate vicinity of the phosphine liberation region, where the latter is in a major space substantially free of bulk commodity—preferably a gas space above the bulk commodity—the commencement may be related to the $PH_3$ concentration build-up in that gas space, which again should not be allowed to rise above the safety limits herein described and/or known to persons skilled in the art.

The $PH_3$ concentration in the zone close to the phosphine liberation region or in the gas space may be determined analytically, e.g. by suitable instruments, which are known per se and which may or may not operate automatically and preferably continuously or semi-continuously.

Alternatively the $PH_3$ concentration may be calculated or computed on the basis of the known or empirically established interrelationship between such concentration and the parameters determining the rate of $PH_3$ release from the metal phosphide composition used for generating the phosphine.

The term "phosphine liberation region(s)" generally denotes the outlines of a hydrolysable metal phosphide composition or metal phosphide-containing article, adapted to release phosphine on exposure to humidity and resultant hydrolysis of the phosphide. Such composition or region may take the form of tablets or pellets (loose or contained in a dispenser device), powder or granules, e.g. contained in sachets or socalled "bag blankets", pressed or composite plates, e.g. having a fibrous and/or plastics matrix.

Preferably the gas flow induction is carried out such that the interstitial gas of the commodity is changed from 5 to 15 times within the period required for 90% of the available phosphine of the metal phosphide to be released preferably 6–12 times, more preferably 6–8 times. Preferably the gas circulation program is terminated after 90–98%, more preferably 90–95% of the gas has been released.

According to a further aspect of the invention, a process as set out in the opening paragraph is provided wherein a closed loop gas flow in repeated pulses is induced from a gas space above the bulk commodity past the region(s) of phosphine release and through substantially the entire height of the bulk commodity and back to the gas space, each pulse having a flow rate and duration sufficient to draw through the bulk commodity a volume of gas at least equal to the volume of the gas space above the bulk commodity and the pulse frequency being at least such that a complete change of interstitial gas in the bulk commodity takes place in less than the time taken for releasing 50% of the available phosphine gas of the metal phosphide, the intervals between successive pulses being about from 2 to 100 times as long as the duration of the pulses, preferably from 3 to 60 times, more preferably from 10 to 40 times. Again the direction of flow is preferably from the bottom region of the bulk commodity upwards, and one limb of the closed loop is separate from the bulk commodity, e.g. outside the storage space therefor.

Preferably the pulse frequency is at least such that a complete interstitial gas change takes place in less than the time taken for releasing 30%, preferably 20% of the available phosphine gas of the metal phosphide. The aforesaid two aspects are preferably combined.

According to yet a further aspect of the invention a process as set out in the opening paragraph is provided wherein a closed loop gas flow in repeated pulses is induced past the region(s) of phosphine gas release and through substantially the entire volume of the bulk commodity and back along a separate path to complete the loop, each pulse length being from 8 to 80 minutes and the flow rate being such that a volume of gas equal to from 30 to 150% of the interstitial volume of the bulk commodity is conveyed through the commodity in each pulse, the intervals between pulses being 2 to 15 hours and in any event such that a complete air change, and more preferably at least two complete air changes is/are brought about in the bulk commodity within the first 24 hours of the process. Again this aspect is preferably applied in combination with either or both of the aforesaid aspects.

Preferably a volume of gas equal to from about 50 to about 100% of the interstitial volume of the bulk commodity is conveyed through the commodity in each pulse.

Advantageously the flow rate during each pulse is such as would produce a complete change of interstitial gas in 8 to 80 minutes, more particularly in 15 to 30 minutes.

Preferably the metal phosphide composition is spread on top of the commodity, but out of direct contact therewith. For example the metal phosphide composition is contained in or spread on a gas-pervious, but substantially dust-proof wrapping or sheet. More preferably the metal phosphide is applied in "bag blankets" as hereinbefore defined, spread out on top of the commodity.

Alternatively the metal phosphide is held suspended in the space above the heaped bulk commodity. Such a process is for example, carried out in a silo, the phosphide preparation being applied in bag blankets as hereinbefore defined, the bag blankets being suspended from the region of a manhole or the like in the top of the silo.

According to a further preferred aspect of the invention which may optionally and preferably be combined with the preceding aspects a bulk commodity is fumigated with a gas stream circulating therethrough containing a lethal concentration of phosphine gas and having a content of extraneously introduced carbon dioxide substantially higher than the atmospheric $CO_2$ content. By "extraneously introduced" is meant a content of $CO_2$ over and above that released by any ingredients (e.g. ammonium carbamate) of the metal phosphide preparation used.

The $CO_2$ has a beneficial synergistic effect on the killing rate due to the $PH_3$ in that it lowers the concentration x time constant required for exterminating a grain pest. It allows effective fumigation at lowered $PH_3$ levels, thereby lowering the auto-ignition risk. It also has a favourable effect on auto-ignition levels of the PH$_3$ concentration.

For reasons of economics it is usually preferred to carry out the process in air, enriched with up to 30% CO$_2$.

The process may be carried out in an apparatus comprising a storage space containing a bulk commodity, means for inducing a gas flow through the commodity and back along a separate path at a rate to comply with the requirements as defined for said process, and a timing device programmed to switch on and off a gas flow in a manner and according to a time pattern as set out in the aforegoing. The program may be adapted to be set automatically or manually as a function of time, e.g. coupled to a temperature sensing and/or moisture sensing probe or probes contained in the gas space and/or in other regions of the apparatus. The temperature is relevant because it determines the rate of phosphine release for a given metal phosphide preparation and for a given humidity. The temperature is also relevant because it determines the safe upper concentration limit before auto-ignition and possibly explosions occur. The temperature moreover controls the metabolism of insect pests and therefore the optimum phosphine concentration for the eradication.

Such apparatus may comprise gas circulation ducts to provide the separate path, including a gas blower or equivalent and valve means in the ducts adapted to interrupt the closed loop flow and instead to draw in atmospheric air and to return the air through a vent to the atmosphere after having passed through the commodity. It may optionally include phosphine absorption or destruction means connected to the vent adapted to remove phosphine from the return air.

These features are useful for the rapid removal of poisonous phosphine gas after having completed the treatment of the bulk commodity.

The storage space may be the interior of a store, a bin, a silo, a shiphold, a railway truck or a road truck.

BRIEF DESCRIPTION OF THE DRAWINGS

In the following the invention will be explained further by way of example with reference to the accompanying drawings.

In the drawings

FIG. 1 represents a grain silo incorporating apparatus features in accordance with the invention;

FIG. 2 represents diagrammatically a cross section through a shiphold incorporating apparatus features in accordance with the present invention;

FIG. 3 illustrates diagrammatically a cross section through a PVC-covered grain storage bunker incorporating apparatus features in accordance with the present invention.

DESCRIPTION OF SPECIFIC EMBODIMENTS

Referring to FIG. 1, the silo 1 is filled with grain 2 up to a level 3 above which there is a gas space 4. The silo is adapted to be filled through a hatch 5 in the top of the silo which hatch is sealed in a gastight manner. A gas circulating device is provided comprising a suction fan 6, a withdrawal pipe 7 leading from the upper gas space 4 down to the fan 6 and a discharge pipe 8 leading into the bottom of the heaped grain 2 and having distributed over its length an adequate number of gas discharge apertures in the region 9. For improved gas distribution that region 9 may take the form of an annular pipe loop which is illustrated purely diagrammatically and which in practice might for example be incorporated in the wall of the silo. The inlet pipe 7 of the fan also comprises a valve controlled inlet pipe nipple 10 directly leading to the atmosphere. The operation of the fan is adapted to be controlled by a control relay box 11 which in turn is operated on the one hand by a time switch device 12 and an automatic monitoring apparatus 13. The monitoring apparatus 13 in turn receives and processes signals from measuring probes 14 and 15 of which only two are shown, probe 14 leading into the upper gas space 4, whilst probe 15 extends into the central region of the grain 2. Preferably there are additional probes for example, in the immediate vicinity of the gas generation region to be described further below. The probes include temperature measuring gauges and/or automatic phosphine measuring probes. In addition there may be moisture measuring probes as well.

Optionally there is connected to the control apparatus 13 an automatic recorder 16 which keeps a record of the parameters measured by the monitoring apparatus 13 and of the progress of the fumigation operation, in particular of the times of switching on and off of the fan 6.

The apparatus of FIG. 1 can be operated in a variety of manners, these operating and control manners being optionally combined.

In a particularly simple operating mode the time switch 12 is manually set to a predetermined operating cycle which may optionally be modified as the fumigation proceeds in accordance with data recorded at 16, such as temperature variations and phosphine concentrations at different localities of the apparatus. However, usually it is possible on the basis of the known volume and contents of the silo, the known or expected average temperature, the previously measured humidity inside the silo and the calculated dosage of phosphine releasing composition to predetermine the operating cycles for the whole duration of the fumigation with sufficient accuracy.

Alternatively, the monitoring box 13 comprises or is connected to a computer programmed to itself preset and optionally adjust from time to time a built-in time switch device on the basis of the data signals supplied by the various probes.

As a further alternative, the control and monitoring apparatus 13 may be designed to merely operate the fan 6 in response to the gas concentration monitored by the probes 14, 15 reaching certain predetermined levels.

The apparatus may also be programmed to switch on the gas circulation as soon as the PH$_3$ concentration at probe 14 exceeds that at probe 15 by a predetermined absolute or relative amount, e.g. by 20%, and to switch off the circulation as soon as the concentrations at the two localities have attained a different predetermined relationship, e.g. equality.

In addition, the monitoring box 13 and the time switch 12 may be preset to stop all further circulation once a predetermined phosphine concentration level has been attained throughout the apparatus and/or after a predetermined time, more particularly being the known time at which under the prevailing conditions of the temperature and humidity the metal phosphide preparation is known to have released substantially all its available phosphine gas, e.g. at least 90% of the available phosphine.

In the present example it is assumed that so-called "bag blankets" (a proprietary brand of dispenser device for pre-packed dosage units of metal phosphide manufactured by Detia Freyberg GmbH and supplied by Detia Export GmbH) are used to introduce and localise the metal phosphide composition. Their immediate surroundings, e.g. within 10 cm of the surface is considered the phosphine generating region for present purposes. However, any convenient limits for such region may be selected. These "bag blankets" in the form of long strips 17, each having an attachment 18 are each introduced through the hatch 5 at the beginning of the operation and suspended from the attachment cord 18. This may be so done that the "bag blankets" hang freely in the upper gas space 4 or (as shown in the drawing) that the lower part of the "bag blanket" rests on the upper surface 3 of the grain 2.

At the end of the fumigation period the hatch 5 is opened, the spent "bag blankets" 17 are withdrawn through the hatch and disposed of.

The direction of the gas flow through the pipe system and through the commodity 2 is indicated by arrows 19 and 20. After the fumigation period has been completed, the apparatus can be used to aerate the commodity in order to remove the residual phosphine gas therefrom. For this purpose the hatch 5 is opened and a three-way valve 21 is so operated that atmospheric air enters the fan 6 through the inlet nipple 10 and is blown through the commodity 2 in the direction of arrow 20 and out through the hatch 5.

If there are objections to releasing the residual phosphine gas to the atmosphere, the hatch 5 may be kept closed and a further three-way valve 22 may be operated to release the gas from space 4 through a further pipe connection 23 leading into a phosphine absorption or decomposition device which is not shown.

Referring now to FIG. 2 of the drawings, the arrangement in principle is similar to that according to FIG. 1, except that the silo 1 is replaced by a shiphold 1' which is again filled with a bulk commodity such as grain 2. In FIG. 2 like integers are denoted by the same reference numbers as in FIG. 1. The instrumentation described with reference to FIG. 1 can be the same in principle in FIG. 2 as in FIG. 1, but is not shown. The fan 6 in this case delivers the gas withdrawn from the upper gas space 4 through a down pipe 8' into a pipe manifold system with discharge apertures 9'.

Referring now to FIG. 3, the invention is applied to the fumigation of a PVC-lined and PVC-covered earth storage bunker for grain which comprises a large trench comprising an earth floor 24 flanked on either side by earth banks 25. The trench is filled with grain 2, heaped to a level well above the ground. The trench is lined with PVC sheeting and covered with PVC sheeting. In order to introduce the fumigation composition, "bag blankets" 17 are introduced with a suitable rod or pole through slits in the sheet cover 26 to come to lie between the top of the grain 2 and the PVC sheet 27. The introduction holes are subsequently closed again.

Prior to the introduction of the grain, a set of longitudinal pipes 28 having series of outlet apertures 9" is laid on the floor of the trench and is interconnected by a manifold pipe 29, leading to a pipe 30 which passes to the delivery fan 6, the operation of which is controlled by a time switch 12. From the fan 6 a pipe 31 leads to a perforated pipe 32 laid along the length of the apex of the grain heap.

As indicated by arrows 33 and 34, it is preferred in this embodiment, because of the configuration of the apparatus to circulate the gas in a downward direction through the grain, so that the pipe system 28, 29, 30 serves to draw the phosphine gas from the region of the bag blanket 17 downwards through the grain and back to the fan 6 to be recycled through pipes 31, 32 to the apex of the heap.

Optionally measuring probes may be provided in appropriate positions as in FIG. 1. However, these are not illustrated in FIG. 3.

Storage bunkers of the type to which FIG. 3 refers have been used successfully, particularly in Australia. However, due to exposure to the sun, the temperatures underneath the PVC cover can become quite high, and it is for this reason that the present invention provides a substantially improved safety. Prior to the present invention this kind of arrangement was inclined to result in gas concentrations exceeding the autoignition limit due to high temperatures in hot climates and due to the small volume of the gas space surrounding the metal phosphide composition. This problem had been aggravated when the "bag blankets" containing aluminium phosphide were replaced by different devices containing magnesium phosphide as the active ingredient.

EXAMPLES

Example 1

A small silo cell similar to that illustrated in FIG. 1 having a volume of 188 $m^3$ is filled with 133 tons of wheat. The interstitial volume amounts to about 70 $m^3$. The fan 6 has a capacity of 360 $m^3$ per hour. It is switched on at two hourly intervals for 15 minutes for three days. Accordingly, each switch-on cycle of 15 minutes amounts to an interstitial gas exchange of about 120% if the volume of the space 4 is also taken into account.

The dosage of aluminium phosphide composition was 1 sachet per 2 $m^3$ of total cell volume (the sachets being incorporated in bag blankets and each sachet containing 23 g of technical aluminium phosphide.

After one and a half days the desired maximum concentration of 1500 ppm had been attained.

After three days the gas circulation was stopped. After one week the silo was opened and aerated. In a test run conducted in 9° to 10° C. (which is a low temperature at which to conduct fumigations with aluminium phosphide) the disinfestation was nevertheless complete, all insect pests regardless of their life cycle having been killed off completely.

In this test run the phosphine gas concentration was not observed to exceed even the relatively moderate level of 2500 ppm at any time or in any part of the apparatus, not even in the immediate vicinity of the bag blankets.

However, in comparative tests using the same kind of apparatus at more common, higher temperatures without gas circulation or where the gas circulation was too slow, concentrations of 15,000 ppm were reached before the experiments were stopped to avoid explosions. In one case the gas concentration reached 20,000 ppm.

The apparatus will optionally be provided with means for introducing moisture into the apparatus. This will be advisable in very dry climates where the moisture content of the atmosphere and of the commodity may be less than optimal for a favourable hydrolysis rate. Moisture may be introduced, (e.g. into head space 4) preferably through one or more atomiser nozzles 35. This may be done automatically in response to the moisture readings of moisture sensing probes, e.g. at 14.

Example 2

Example 1 was repeated with a different silo cell of similar design to that of example 1, however, having a capacity of 723 m³ suitable for holding 550 tons of wheat. The procedure and results were substantially the same as in the case of example 1 except that the maximum concentration of PH$_3$, with uniform gas distribution throughout the cell was 1200 ppm. Again pest eradication was complete.

Example 3

Using the same apparatus as in example 2, the time switch is set to switch on the fan for the first time four hours after the introduction of the bag blankets and for a duration of two hours and thereafter once daily for two hours. Each two hour cycle of the fan amounts to about two complete interstitial gas exchanges. Although in this example higher maximum concentrations of phosphine gas are reached in the immediate vicinity of the bag blankets and in the gas space 4 the concentrations do not at any stage reach dangerous or disadvantageous levels. After the second fan operation cycle there already exists a substantially uniform and lethal concentration of phosphine gas throughout the silo and after the third cycle the entire silo has reached substantially maximum phosphine concentration, whereafter no further recycling takes place.

Example 4

Example 3 is modified. The fan is set to operate for 70 minutes for the first time four hours after the introduction of the bag blankets and thereafter for 70 minutes at a time once every 8 hours, altogether nine times. In this example the maximum concentration of 1200 ppm is uniformly distributed throughout the silo after one and a half days. The highest local accumulation of phosphine measured throughout the experiment is in the region of 2500 ppm.

Example 5

A silo filled with wheat as described in Example 1 is fumigated with magnesium phosphide pellets scattered on the top surface of the heaped grain, using 30 pellets per ton of wheat (each pellet delivering 1 g PH$_3$). The gas circulation is switched on after 1½ hours (when the PH$_3$ concentration in the gas head space has reached 2000 ppm). The circulation is continued for 15 minutes (120% gas change), whereafter the PH$_3$ concentration throughout is 250 ppm. The circulation is repeated once every 1½ hours and stopped finally after 15 hours when no further concentration increase is observed. The maximum concentration observed after equilibrium is about 1000 ppm. The silo is left closed for 5 days for complete eradication.

Example 6

A large silo containing 3600 tons maize is fumigated as described in Example 1 at 25° C. The fumigant is applied in the form of "bag blankets", in an amount of 1 sachet per 5 tons of maize. The interstitial volume is about 50% of the bulk volume of the grain, and the empty head space constitutes about 10% of the silo volume. The first circulation pulse is applied after 12 hours at which stage the concentration in the head space is 1600 ppm. The pulse duration is 1 hour during which period about 60% of the interstitial volume is displaced. The gas concentration in the head space drops to about 200 ppm. The circulation is repeated once every 12 hours and is stopped altogether after the 6th pulse. After 2½ days a maximum PH$_3$ concentration of 700 ppm has been attained throughout the silo. After 1 week the pest eradication is found to be complete.

The aforegoing examples when read in the context of the general description of the invention and the claims will enable the person skilled in the art to practise the invention as set out in the claims which follow. The claims are to be considered an integral part of the present disclosure.

I claim:

1. In a process for treating with phosphine gas a bulk commodity infested with or susceptible to infestation by pests, while being stored or transported in a closed space, such as a bulk container, a bulk storage or transportation vessels or bin, silo, shiphold, bulk transport railway or road truck or the like, in which phosphine gas, produced by the controlled hydrolysis over a period of about 0.25 to 20 days of a suitable hydrolyzable metal phosphide, is released into at least one region of the bulk commodity, is spread throughout the entire bulk commodity, and is maintained therein in a concentration and for a duration effective to destroy any pests in the bulk commodity, the improvement which comprises the step of inducing a closed loop gas flow for the phosphine gas in a path through the bulk commodity which travels through the region of phosphine gas release towards a region of the bulk commodity remote and opposite therefrom and then back to the region of release along a separate return path, the gas flow being (i) commenced before the phosphine concentration in a zone adjoining the region of phosphine gas release rises above a preselected limit which is well below the auto-ignition limit for the phosphine gas; (ii) maintained at a concentration reducing rate at least until the concentration in that zone has dropped to a second low value which at most is approximately equal to the average concentration of phosphine gas throughout the closed space; and (iii) repeated for as often and as long as is necessary to prevent a rise in phosphine concentration in that zone above the auto-ignition limit, the circulation of the gas through the loop being adjusted at given times based on the concentration of phosphine gas at those times in the zone adjoining the region of phosphine gas release and the average concentration of phosphine gas throughout the closed space.

2. Process according to claim 1, wherein the preselected limit is about 6000 ppm PH$_3$.

3. Process according to claim 1, wherein the gas flow is induced before the PH$_3$ concentration in the zone exceeds by more than 50% the predetermined maximum average concentration throughout the system for optimum fumigation conditions.

4. Process according to claim 2, wherein the gas flow is induced before the concentration in the zone exceeds by more than 20% the predetermined maximum average concentration.

5. Process according to claim 3, wherein that gas flow is initially induced before the concentration in the zone reaches the predetermined maximum average concentration.

6. Process according to claim 1, wherein the gas flows in the loop through the bulk commodity is in an upward direction.

7. Process according to claim 1, wherein the PH$_3$ liberation occurs in a space substantially free of bulk commodity and wherein the concentration limit which determines the onset of induced gas circulation is defined as a concentration prevailing in that space.

8. Process according to claim 7, wherein the space is above the upper region of the bulk commodity and phosphine-containing gas is withdrawn by suction from that space and conducted into the bottom region of the bulk commodity and from there upwards through the bulk commodity towards the upper region.

9. Process according to claim 1, wherein the gas flow induction is carried out such that the interstitial gas of the commodity is changed from 5 to 15 times within the period required for 90% of the available phosphine of the metal phosphide to be released.

10. Process according to claim 9, wherein the interstitial gas is changed 6–12 times during the stated period.

11. Process according to claim 1, wherein the gas circulation program is terminated after 90–98% of the phosphine gas has been released.

12. Process according to claim 1, wherein each gas circulation pulse has a flow rate and duration sufficient to draw through the bulk commodity a volume of gas at least equal to the volume of the gas space above the bulk commodity and the pulse frequency is such that at least a complete change of interstitial gas in the bulk commodity takes place in less time than that taken for releasing 50% of the available phosphine gas of the metal phosphide.

13. Process according to claim 1, wherein the closed loop gas flow is induced in repeated pulses from a gas space above the bulk commodity past the region where the phosphine gas is introduced and through substantially the entire height of the bulk commodity and back to the gas space, each pulse having a flow rate and duration sufficient to draw through the bulk commodity a volume of gas at least equal to the volume of the gas space above the bulk commodity, the pulse frequency being at least such that a complete change of interstitial gas in the bulk commodity takes place in less time than that taken for releasing 50% of the available phosphine gas of the metal phosphide, and the intervals between successive pulses being about from 2 to 100 times as long as the duration of the pulses.

14. Process according to claim 13, wherein the intervals between successive pulses are from 3 to 60 times as long as the durations of each pulse.

15. Process according to claim 13, wherein the pulse frequency is at least such that a complete interstitial gas change takes place in less time taken for releasing 30% of the available phosphine gas of the metal phosphide.

16. Process according to claim 15, wherein each pulse length is from 8 to 80 minutes and the flow rate is such that a volume of gas equal to from 30 to 150% of the interstitial volume of the bulk commodity is conveyed through the commodity in each pulse, the intervals between pulses being 2 to 15 hours and in any event such that a complete air change is brought about in the bulk commodity within the first 24 hours of the process.

17. Process according to claim 1, wherein the closed loop gas flow in induced in repeated pulses past the region where the phosphine gas is introduced and through substantially the entire volume of the bulk commodity and back along a separate path to complete the loop, each pulse length being from 8 to 80 minutes, the flow rate being such that a volume of gas equal to from 30 to 150% of the interstitial volume of the bulk commodity is conveyed through the commodity in each pulse, and the intervals between pulses being a period of time from 2 to 15 hours such that a complete air change is brought about in the bulk commodity within the first 24 hours of the process.

18. Process according to claim 17, wherein at least two complete gas changes are brought about in the bulk commodity within the first 24 hours of the process.

19. Process according to claim 17, wherein a volume of gas equal to from about 50 to about 100% of the instertitial volume of the bulk commodity is conveyed through the commodity in each pulse.

20. Process according to claim 17, wherein the flow rate during each pulse is such as would produce a complete change of interstitial gas in 8 to 80 minutes.

21. Process according to claim 1, wherein the metal phosphide composition is spread on top of the commodity but out of direct contact therewith.

22. Process according to claim 1, wherein the metal phosphide is applied in bag blankets which are exposed to the gas phase above the heaped commodity to release phosphine into that space.

23. Process according to claim 1, wherein the gas stream being circulated has a content of extraneously introduced carbon dioxide substantially higher than the atmospheric $CO_2$ content.

24. Process according to claim 23 wherein the phosphine is spread throughout the entire bulk commodity with air enriched with up to 30% $CO_2$.

25. Process according to claim 1, wherein the ambient moisture content in the region of the phosphine liberation is supplemented by the introduction of extraneous moisture.

26. Apparatus for treating with phosphine a bulk commodity infested with or susceptible to infestation comprising a closed storage space adapted for containing a bulk commodity, means for releasing phosphine gas into bulk commodity stored in the storage space, means for inducing a closed loop gas flow through the bulk commodity store in the storage space, in a path which travels through the region of phosphine gas release into the bulk commodity to an area of the bulk commodity remote and opposite therefrom and then back along a separate return path to the region of phosphine gas release, and a timing device programmed to (i) commence the gas flow before the phosphine concentration in a zone adjoining the region of phosphine gas release rises above a preselected limit which is well below the auto-ignition limit for the phosphine gas; (ii) maintain the gas flow at a concentration reducing rate at least until the concentration in that zone has dropped to a second low value which at most is approximately equal to the average concentration of phosphine gas throughout the closed space; and (iii) repeat the gas flow for as often and as long as is necessary to prevent a rise in phosphine concentration in that zone above the auto-ignition limit, directly or indirectly on the basis of operating parameters which determine the phosphine concentrations at given times in a zone adjoining the region of phosphine gas release and in other parts of the closed space.

27. Apparatus according to claim 26, wherein the timing device is coupled to and programmed to respond to signals generated by at least one of a temperature sensing and a moisture sensing probe contained in at least one of the gas space and another region of the apparatus.

28. Apparatus according to claim 26, wherein the timing device is coupled to and programmed to respond to signals generated by means for sensing the phosphine concentration in the apparatus.

* * * * *